US012759791B2

(12) United States Patent
Komura et al.

(10) Patent No.: US 12,759,791 B2
(45) Date of Patent: Oct. 13, 2026

(54) CONVEYANCE SYSTEM, CONVEYANCE METHOD, AND PROGRAM

(71) Applicant: TOYOTA JIDOSHA KABUSHIKI KAISHA, Toyota (JP)

(72) Inventors: Hirotaka Komura, Tokyo-to (JP); Yuta Itozawa, Nagoya (JP); Takatoshi Morimitsu, Toyota (JP); Kunihiro Iwamoto, Nagakute (JP); Uori Koike, Saitama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 18/484,990

(22) Filed: Oct. 11, 2023

(65) Prior Publication Data

US 2024/0124228 A1 Apr. 18, 2024

(30) Foreign Application Priority Data

Oct. 17, 2022 (JP) ................................ 2022-166012

(51) Int. Cl.
*B65G 1/04* (2006.01)
*B65G 43/02* (2006.01)

(52) U.S. Cl.
CPC ......... *B65G 1/0471* (2013.01); *B65G 1/0457* (2013.01); *B65G 43/02* (2013.01); *B65G 2203/0283* (2013.01)

(58) Field of Classification Search
CPC ... B65G 1/0435; B65G 1/0492; B60P 1/4464; H10P 72/3408
USPC .................................................. 414/279, 281
See application file for complete search history.

(56) References Cited

U.S. PATENT DOCUMENTS

| | | | | | |
|---|---|---|---|---|---|
| 2006/0051191 | A1 * | 3/2006 | Dupuy | B60P 1/4464 | 414/522 |
| 2007/0065258 | A1 * | 3/2007 | Benedict | B65G 1/04 | 414/266 |
| 2014/0212249 | A1 * | 7/2014 | Kawano | B65G 1/0435 | 414/277 |
| 2022/0267091 | A1 | 8/2022 | Ota et al. | | |

FOREIGN PATENT DOCUMENTS

| | | | |
|---|---|---|---|
| JP | 2007-281073 | A | 10/2007 |
| JP | 6413899 | B2 | 10/2018 |
| JP | 2022-127887 | A | 9/2022 |

* cited by examiner

*Primary Examiner* — Saul Rodriguez
*Assistant Examiner* — Juan S Moscoso
(74) *Attorney, Agent, or Firm* — Sughrue Mion, PLLC

(57) ABSTRACT

A conveyance system, a conveyance method, and a program that are capable of preventing an article stored in a shelf from falling are provided. A conveyance system according to one aspect of the present disclosure includes: a shelf provided with a guide rail extending in a vertical direction; a mounting table that is engageable with the guide rail; a lifting part configured to lift the mounting table up and down; an engagement detection sensor configured to detect engagement between the guide rail and the mounting table; and a safety control unit configured to stop an operation of the lifting part when a first condition including that the guide rail is not engaged with the mounting table is satisfied.

11 Claims, 13 Drawing Sheets

30

| ENGAGEMENT WITH RAIL | HEIGHT | RELAY1 | RELAY2 |
|---|---|---|---|
| NOT DETECTED | LESS THAN h1 | ON | ON |
| DETECTED | LESS THAN h1 | ON | OFF |
| DETECTED | GREATER THAN OR EQUAL TO h1 | ON | OFF |
| NOT DETECTED | GREATER THAN OR EQUAL TO h1 | OFF | OFF |

Fig. 10

40

| ENGAGEMENT WITH RAIL | HEIGHT | SPEED | RELAY |
|---|---|---|---|
| NOT DETECTED | LESS THAN h1 | x | ON |
| DETECTED | LESS THAN h1 | x | ON |
| DETECTED | GREATER THAN OR EQUAL TO h1 | =0 | ON |
| NOT DETECTED | GREATER THAN OR EQUAL TO h1 | x | OFF |
| DETECTED | GREATER THAN OR EQUAL TO h1 | >0 | OFF |

Fig. 12

CONVEYANCE SYSTEM, CONVEYANCE METHOD, AND PROGRAM

CROSS REFERENCE TO RELATED APPLICATIONS

This application is based upon and claims the benefit of priority from Japanese patent application No. 2022-166012, filed on Oct. 17, 2022, the disclosure of which is incorporated herein in its entirety by reference.

BACKGROUND

The present disclosure relates to a conveyance system, a conveyance method, and a program.

Japanese Patent No. 6413899 discloses a conveyance robot that places an article on a carriage and conveys it.

SUMMARY

As means for storing an article placed on a carriage in a shelf or for placing an article stored in a shelf on a carriage, it is conceivable that a guide rail is provided in a shelf so that a mounting table is lifted up along the guide rail. In this case, however, there is a problem that when the mounting table that is not engaged with the guide rail is lifted up, an article may fall.

The present disclosure has been made in view of the above-described problem and provides a conveyance system, a conveyance method, and a program that are capable of preventing an article stored in a shelf from falling.

A conveyance system according to one aspect of the present disclosure includes:

- a shelf provided with a guide rail extending in a vertical direction;
- a mounting table that is engageable with the guide rail;
- a lifting part configured to lift the mounting table up and down;
- an engagement detection sensor configured to detect engagement between the guide rail and the mounting table; and
- a safety control unit configured to stop an operation of the lifting part when a first condition including that the guide rail is not engaged with the mounting table is satisfied.

A conveyance method according to one aspect of the present disclosure includes:

- detecting engagement between a guide rail and a mounting table, the guide rail extending in a vertical direction and being provided in a shelf, and the mounting table being engageable with the guide rail; and
- stopping, when a first condition including that the guide rail is not engaged with the mounting table is satisfied, an operation of a lifting part configured to lift the mounting table up and down.

A program according to one aspect of the present disclosure causes a computer to:

- acquire a result of detection by a sensor configured to detect engagement between a guide rail and a mounting table, the guide rail extending in a vertical direction and being provided in a shelf, and the mounting table being engageable with the guide rail; and
- stop, when a first condition including that the guide rail is not engaged with the mounting table is satisfied, an operation of a lifting part configured to lift the mounting table up and down.

According to the present disclosure, it is possible to provide a conveyance system, a conveyance method, and a program that are capable of preventing an article stored in a shelf from falling.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 10 is a diagram for explaining an operation of a safety control unit according to the second embodiment;

FIG. 12 is a diagram for explaining an operation of a safety control unit according to the third embodiment.

DESCRIPTION OF EMBODIMENTS

Specific embodiments to which the present disclosure is applied will be described hereinafter in detail with reference to the drawings. However, the present disclosure is not limited to the following embodiments. Further, for the clarification of the description, the following descriptions and the drawings are simplified as appropriate.

First Embodiment

Figure 1:
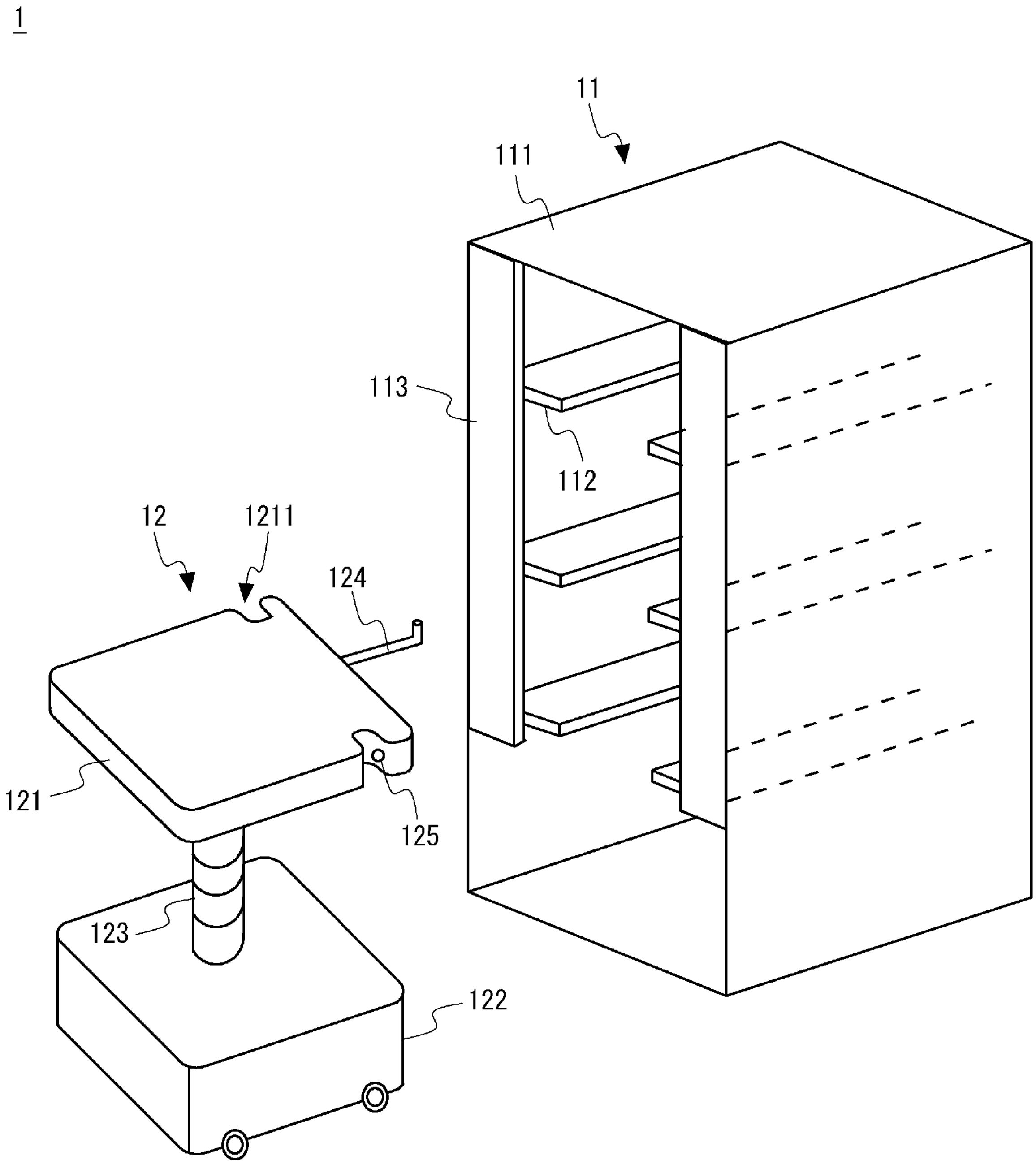
FIG. 1 is a diagram for explaining a configuration of a conveyance system according to a first embodiment.

A conveyance system 1 according to a first embodiment will be described below with reference to the drawings. FIG. 1 is a diagram for explaining an outline of the conveyance system 1. The conveyance system 1 includes a shelf 11 and a conveyance robot 12. The conveyance robot 12 conveyances an article and stores it in the shelf 11. The conveyance robot 12 takes out an article from the shelf 11 and conveys the article that has been taken out.

The shelf 11 holds an article that is not shown. Examples of the article may include a returnable box. The shelf 11 includes a housing 111, a support member 112, and a guide rail 113. The support member 112 supports an article stored in the shelf 11 (see FIG. 2).

The guide rail 113 engages a groove 1211 provided in a mounting table 121 of the conveyance robot 12. The guide rail 113 extends in the vertical direction. The guide rail 113 may be a plate-like member provided so as to be parallel to a front surface of the shelf 11. The plate-like member protrudes inwardly from the housing 111. The guide rail 113 may be provided on each of the left and right sides of the housing 111, or may instead be provided on one of the left and right sides thereof.

The conveyance robot 12 includes the mounting table 121, a moving part 122, a lifting part 123, an extendable arm 124, and an engagement detection sensor 125. The mounting table 121 is a table on which an article can be placed and is also referred to as a top plate. The groove 1211 is provided in the mounting table 121. The groove 1211 is engaged with the guide rail 113 of the shelf 11. The groove 1211 may be provided on each of the right and left sides of the conveyance robot 12 with respect to a direction in which the conveyance robot 12 travels.

The conveyance robot 12 is moved in the horizontal direction by the movable moving part 122. The lifting part 123 is provided on the moving part 122. The lifting part 123 lifts the mounting table 121 up and down. The extendable arm 124 extends and contracts in the horizontal direction. The extendable arm 124 takes out an article from the shelf 11 and places the article on the mounting table 121, and stores the article placed on the mounting table 121 in the shelf 11.

Note that the extendable arm 124 may be provided on the shelf 11 side. Further, an article may be transferred by a mechanism other than the extendable arm 124. Further, the conveyance robot 12 may be fixed to a position near the shelf 11. In this case, the conveyance robot 12 may not include the moving part 122.

The engagement detection sensor 125 is provided in the groove 1211. The engagement detection sensor 125 detects that the guide rail 113 is engaged with the groove 1211. When the guide rail 113 is engaged with the groove 1211, the guide rail 113 is engaged with the mounting table 121. The engagement detection sensor 125 is, for example, a photo interrupter or a photo reflector. In this case, the engagement detection sensor 125 includes a light emitting unit and a light receiving unit. When the light from the light emitting unit is blocked by the guide rail 113, the engagement detection sensor 125 may detect that the guide rail 113 is engaged with the mounting table 121. When the light from the light emitting unit is reflected by the guide rail 113, the engagement detection sensor 125 may detect that the guide rail 113 is engaged with the mounting table 121. Note that the engagement detection sensor 125 may be a sensor (e.g., a contact sensor and a magnetic sensor) that detects a force received from the guide rail 113.

Note that the conveyance system 1 may include a server (not shown) that controls traveling of the conveyance robot 12. The conveyance robot 12 may generate a conveyance route by itself and move autonomously. The conveyance system 1 may include a system which does not include a server and in which processing is completed in the conveyance robot 12.

Figure 2:
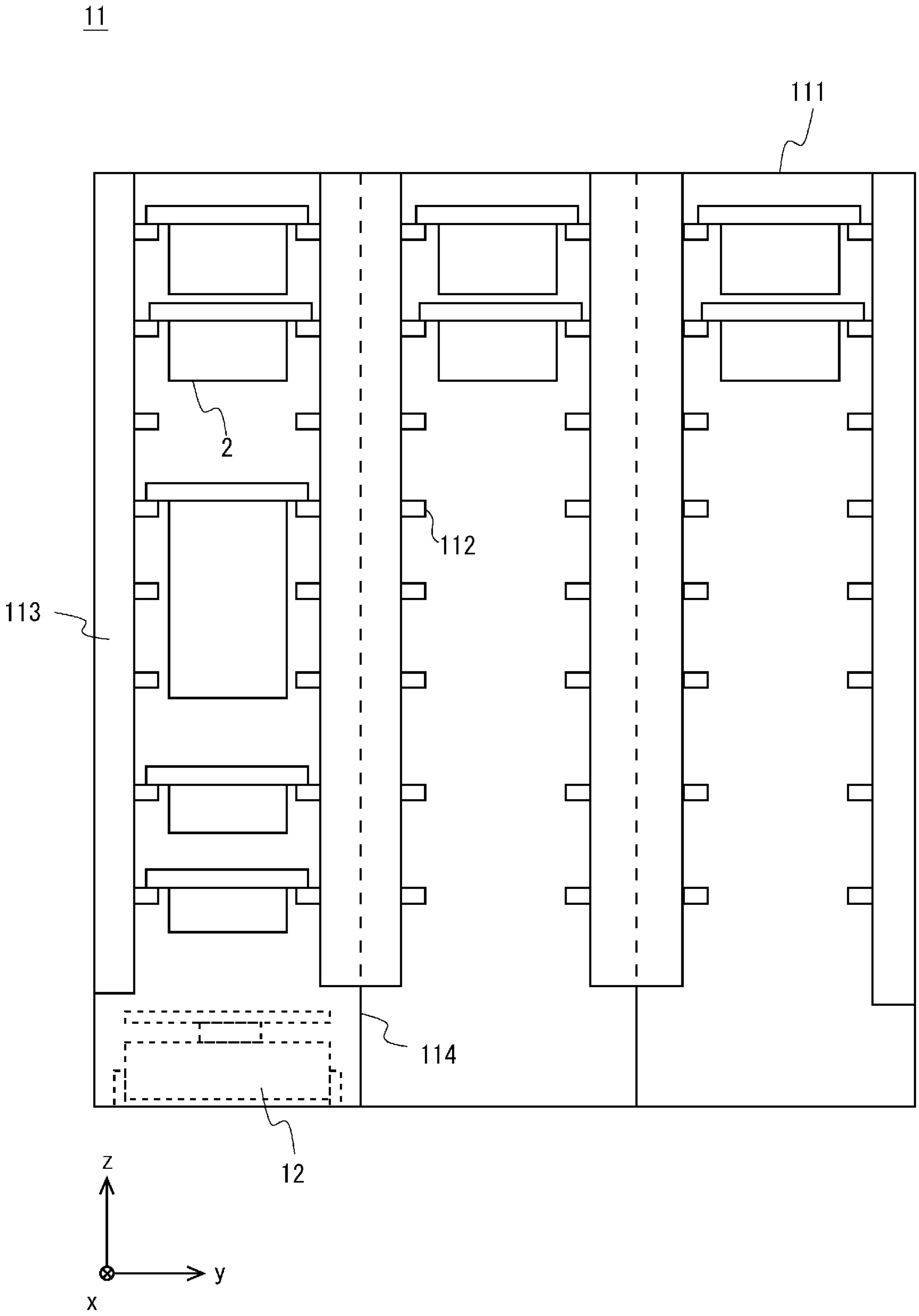
FIG. 2 is a front view of a shelf according to the first embodiment.

An example of a structure of the shelf 11 will be described in detail with reference to FIG. 2. Note that, for the clarification of the description, a three-dimensional orthogonal coordinate system of xyz is shown. The z direction is the vertical direction.

The shelf 11 includes the housing 111, the support member 112, the guide rail 113, and partition plates 114.

The housing 111 has a structure in which a top plate provided on the z-axis positive side, a bottom plate provided on the z-axis negative side, a left side plate provided on the y-axis positive side, and a right side plate provided on the y-axis negative side are integrally formed. A rear surface of the housing 111 may be closed by a rear plate. The bottom plate of the housing 111 may be thinly formed so that the conveyance robot 12 can enter the inside of the housing 111. Further, the housing 111 may not include a bottom plate.

The support members 112 extend in the depth direction (the x-axis direction) and are arranged at equal intervals in the height direction (the z-axis direction) on the inner surfaces of the housing 111 and on the partition plate 114 described later. Protrusion parts that protrude outwardly from an article 2 in the width direction thereof slide on the respective pairs of adjacent support members 112 that face each other, whereby the article 2 can be put into the shelf 11 and taken out of the shelf 11. Note that the support member 112 may support the bottom surface of the article 2. In this case, the article 2 may not include a protrusion part.

The guide rail 113 extends in the vertical direction (the z-axis direction). The guide rail 113 may be a plate-like member parallel to the yz plane. The plate-like member is provided so as to rise substantially vertically from the inner surface of the side plate and the partition plate 114.

A gap into which the conveyance robot 12 enters is formed between the ground or the bottom plate of the housing 111 and the lower end of the guide rail 113. A condition in which the lifting part 123 of the conveyance robot 12 is contracted is shown by a dotted line. The distance between two adjacent guide rails 113 that face each other is greater than the width of the article 2. When the article 2 is put into the shelf 11 and taken out of the shelf 11, the guide rail 113 and the article 2 do not interfere with each other. A notch (a slot) through which the protrusion part of the article 2 passes may be provided in the guide rail 113. In this case, the width of the article 2 may be greater than the distance between the guide rails 113.

The partition plates 114 are provided so as to be parallel to the right and left side plates of the housing 111, that is, so as to be parallel to the xz plane, and so as to be extended from the front surface of the housing 111 to the rear surface of the same. The partition plates 114 are provided so that an interval between the right side plate of the housing 111 and the adjacent partition plate 114, an interval between the left side plate of the housing 111 and the adjacent partition plate 114, and an interval between the partition plates 114 are equal to each other. Note that, in the example shown in FIG. 2, although two partition plates 114 are provided, the number of partition plates 114 is not limited to any particular number. Further, the partition plate 114 may not be provided.

Figure 3:
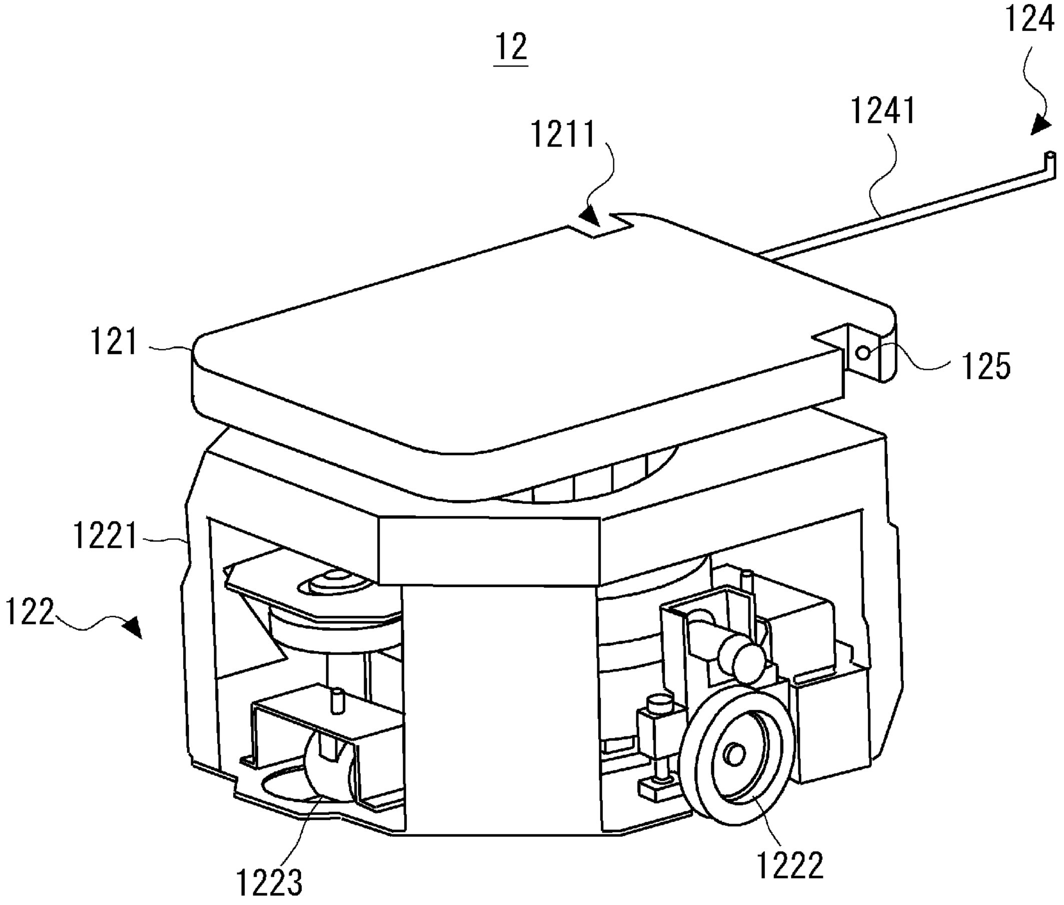
FIG. 3 is a perspective view of a conveyance robot according to the first embodiment.
Figure 4:
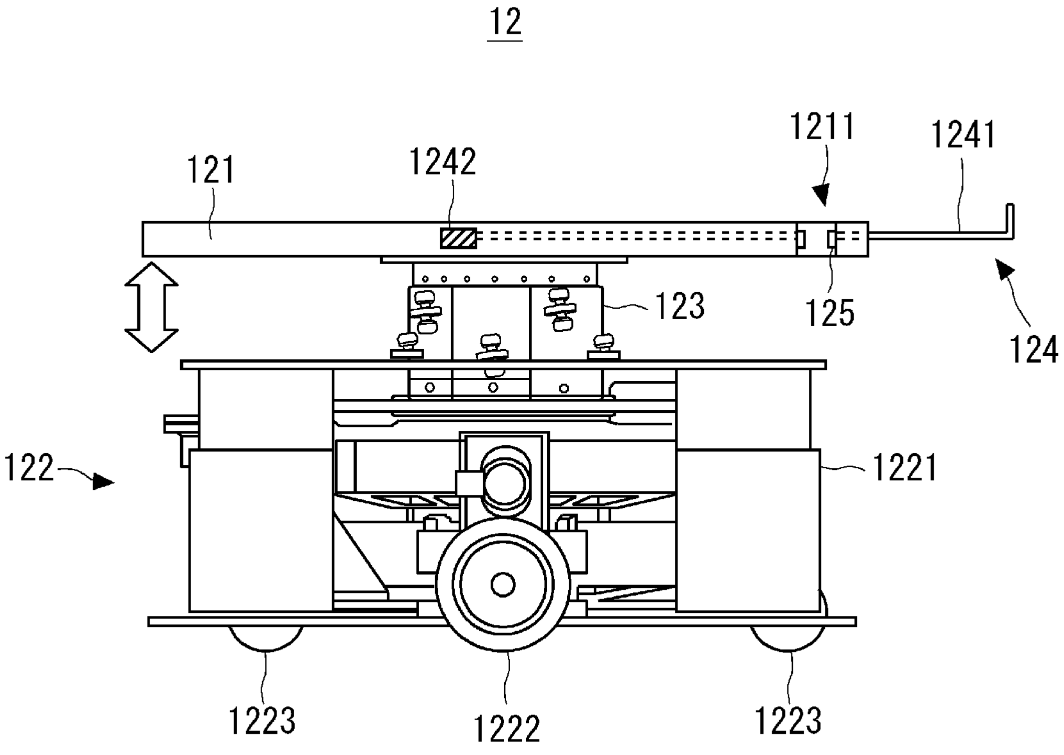
FIG. 4 is a side view of the conveyance robot according to the first embodiment.
Figure 5:
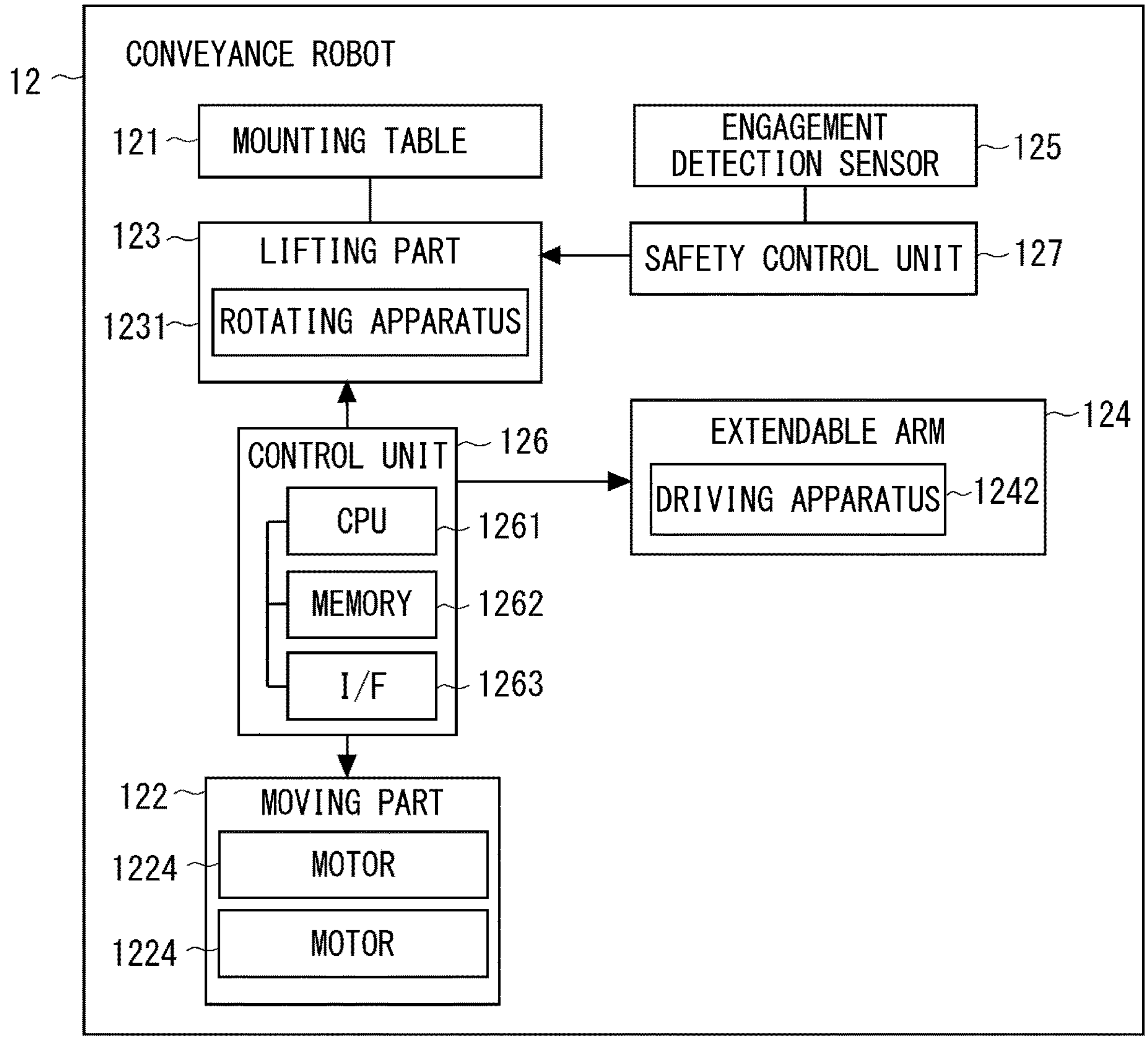
FIG. 5 is a block diagram showing functions of the conveyance robot according to the first embodiment.

Next, the conveyance robot 12 will be described with reference to FIGS. 3, 4, and 5. FIG. 3 is a perspective view showing a configuration of the conveyance robot 12. FIG. 4 is a side view showing the configuration of the conveyance robot 12. FIG. 5 is a block diagram showing a functional configuration of the conveyance robot 12.

As shown in FIGS. 3 and 4, the conveyance robot 12 includes the mounting table 121, the moving part 122, the lifting part 123, the extendable arm 124, and the engagement detection sensor 125. As shown in FIG. 5, the conveyance robot 12 includes a control unit 126 and a safety control unit 127. The control unit 126 controls normal operations performed by the moving part 122, the lifting part 123, and the extendable arm 124. The safety control unit 127 stops (e.g., urgently stops) the operation of the lifting part 123 based on a result of detection by the engagement detection sensor 125. The safety control unit 127 may further stop the operations of the moving part 122 and the extendable arm 124.

The groove 1211 extending in the vertical direction is provided on the side surface of the mounting table 121. The groove 1211 is provided from the lower surface of the mounting table 121 to the upper surface of the same. The groove 1211 is engageable with the guide rail 113.

The moving part 122 includes a moving-part body 1221, a pair of right and left driving wheels 1222 rotatably disposed in the moving-part body 1221, a pair of front and rear driven wheels 1223 rotatably disposed in the moving-part body 1221, and a pair of motors 1224 that rotationally drive the respective driving wheels 1222. Each of the motors 1224 rotates a respective one of the driving wheels 1222 through a speed reducer or the like. Each of the motors 1224 rotates a respective one of the driving wheels 1222 in accordance with a control signal sent from the control unit 126. Each of the motors 1224 rotates a respective one of the driving wheels 1222 in accordance with a control signal sent from the control unit 126, thereby enabling the moving-part body 1221 to move to any position. Note that the above-described configuration of the moving part 122 is merely an example and the configuration of the moving part 122 is not limited to this example. For example, the number of driving wheels 1222 of the moving part 122 and the number of driven wheels 1223 of the moving part 122 may be any number, and any configuration in which the moving-part body 1221 can be moved to any position may be used.

The mounting table 121 is lifted up and down by the lifting part 123 extending and contracting. The lifting part 123 may be formed as a telescopic expanding/contracting mechanism that extends and contracts in the vertical direction. The extendable arm 124 is attached to the mounting table 121. The extendable arm 124 includes an arm body 1241 and a driving apparatus 1242. The driving apparatus 1242, which is attached to a guide rail mechanism (not shown) in the mounting table 121, moves the arm body 1241 in the horizontal direction. The driving apparatus 1242 may further include a mechanism that rotates the arm body 1241 around the axis.

The engagement detection sensor 125 is provided in the groove 1211. The engagement detection sensor 125 may be provided on each of the left and right sides of the mounting table 121. The engagement detection sensor 125 can detect that the groove 1211 is engaged with the guide rail 113. The conveyance robot 12 may further include a movement detection sensor that detects movement of the moving part 122 and a height detection sensor that detects a height of the mounting table 121.

The control unit 126 controls normal operations of the moving part 122, the lifting part 123, and the extendable arm 124. The control unit 126 can control the rotation of each of the driving wheels 1222 and move the moving-part body 1221 to any position by transmitting a control signal to each of the motors 1224 of the moving part 122. The control unit 126 can control a height position of the mounting table 121 by transmitting a control signal to a rotating apparatus 1231 of the lifting part 123. The control unit 126 can also control a horizontal position of the arm body 1241 by transmitting a control signal to the driving apparatus 1242 of the extendable arm 124.

The control unit 126 may control the movement of the moving-part body 1221 by performing well-known control such as feedback control and robust control based on information about the rotations of the driving wheels 1222 detected by a rotation sensor(s) provided in the driving wheels 1222. Further, the control unit 126 may control the operations of the moving part 122, the lifting part 123, and the extendable arm 124 based on information such as information about a distance(s) detected by a distance sensor such as a camera or an ultrasonic sensor provided in the moving-part body 1221 and information about a map of the moving environment.

The control unit 126 is composed mainly of, for example, hardware such as a microcomputer including a Central Processing Unit (CPU) 1261 that performs control processing, arithmetic processing, and the like, a memory 1262 including Read Only Memory (ROM) that stores a control program, an arithmetic program, and the like executed by the CPU 1261, and an interface unit (I/F) 1263 that inputs and outputs signals from and to the outside. The CPU 1261, the memory 1262, and the interface unit 1263 are connected to one another through a data bus or the like.

The safety control unit 127 acquires a result of detection by the engagement detection sensor 125. The safety control unit 127 may further acquire a result of detection by a sensor other than the engagement detection sensor 125. The safety control unit 127 stops the operation of the lifting part 123 when a first condition including that the guide rail 113 is not engaged with the mounting table 121 is satisfied.

Like the control unit 126, the safety control unit 127 may include a processor, a memory, and the like. The safety control unit 127 may be a Programmable Logic Controller (PLC).

The first condition may further include that a height of the mounting table 121 is greater than or equal to a predetermined height h1. When the safety control unit 127 stops the operation of the lifting part 123, the safety control unit 127 may stop the supply of power to the lifting part 123.

Note that when the guide rail 113 is engaged with the mounting table 121, it is not necessary to extend the lifting part 123 in some cases. For example, when the mounting table 121 is configured so that it can be tilted, the guide rail 113 can, upon the mounting table 121 being tilted, engage therewith. Further, for example, when the guide rail 113 is provided on one side of the shelf 11, the guide rail 113 can be engaged with the mounting table 121 by the conveyance robot 12 moving in a direction parallel to the front surface of the shelf 11. In such a case, the first condition may not include a condition regarding the height of the mounting table 121.

According to the first embodiment, when the guide rail is not engaged with the mounting table, the operation of the mounting table can be stopped. By this structure, it is possible to prevent an article stored in the shelf from falling. It is also possible to prevent the conveyance robot from falling.

Second Embodiment

Figure 6:
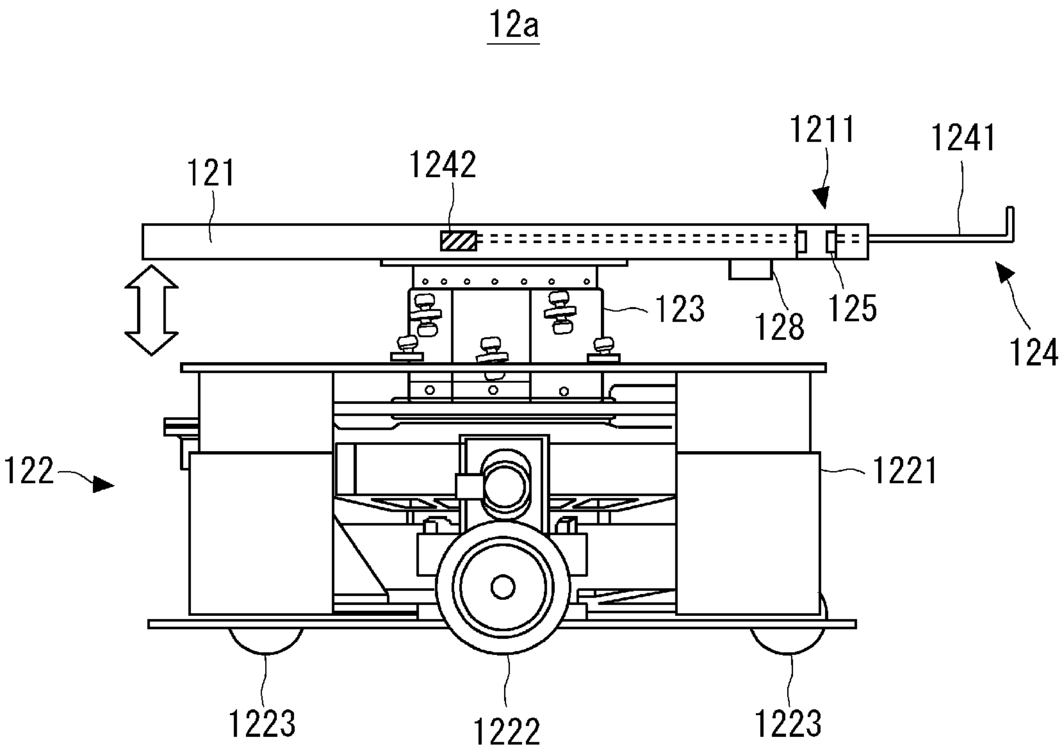
FIG. 6 is a side view of a conveyance robot according to a second embodiment.

A second embodiment is a specific example of the first embodiment. FIG. 6 is a side view showing a configuration of a conveyance robot 12*a* according to the second embodiment. The conveyance robot 12*a* shown in FIG. 6 further includes a height detection sensor 128 in addition to the components shown in FIG. 4. The height detection sensor 128 measures a height of the mounting table 121. The height detection sensor 128 is not required to be capable of measuring a height of the mounting table 121 in millimeters or centimeters. The height detection sensor 128 is only required to be capable of detecting that the height of the mounting table 121 is greater than or equal to the predetermined height h1.

The height detection sensor 128 may measure a height of the mounting table 121 by capturing an image of the lifting part 123 expanding and contracting. For example, in a case in which a plurality of cylinders included in the telescopic lifting part 123 have different colors, it is possible to determine that the height of the mounting table 121 is greater than or equal to the predetermined height h1 when a cylinder of a new color appears. When the lifting part 123 is formed by winding a plurality of bands therearound, each of the bands includes a plurality of parts having different colors. When the length of the lifting part 123 exceeds a predetermined length, new parts having different colors may appear.

Further, the height detection sensor 128 may be a distance measurement sensor that measures a distance between the lower surface of the mounting table 121 and the upper surface of the moving-part body 1221. In this case, the height detection sensor 128 may be provided on the upper surface of the moving-part body 1221 or the lower surface of the mounting table 121. Further, the height detection sensor 128 may measure a distance between the mounting table 121 and the ground. The height detection sensor 128 may be a magnetic detection mechanism.

Figure 7:
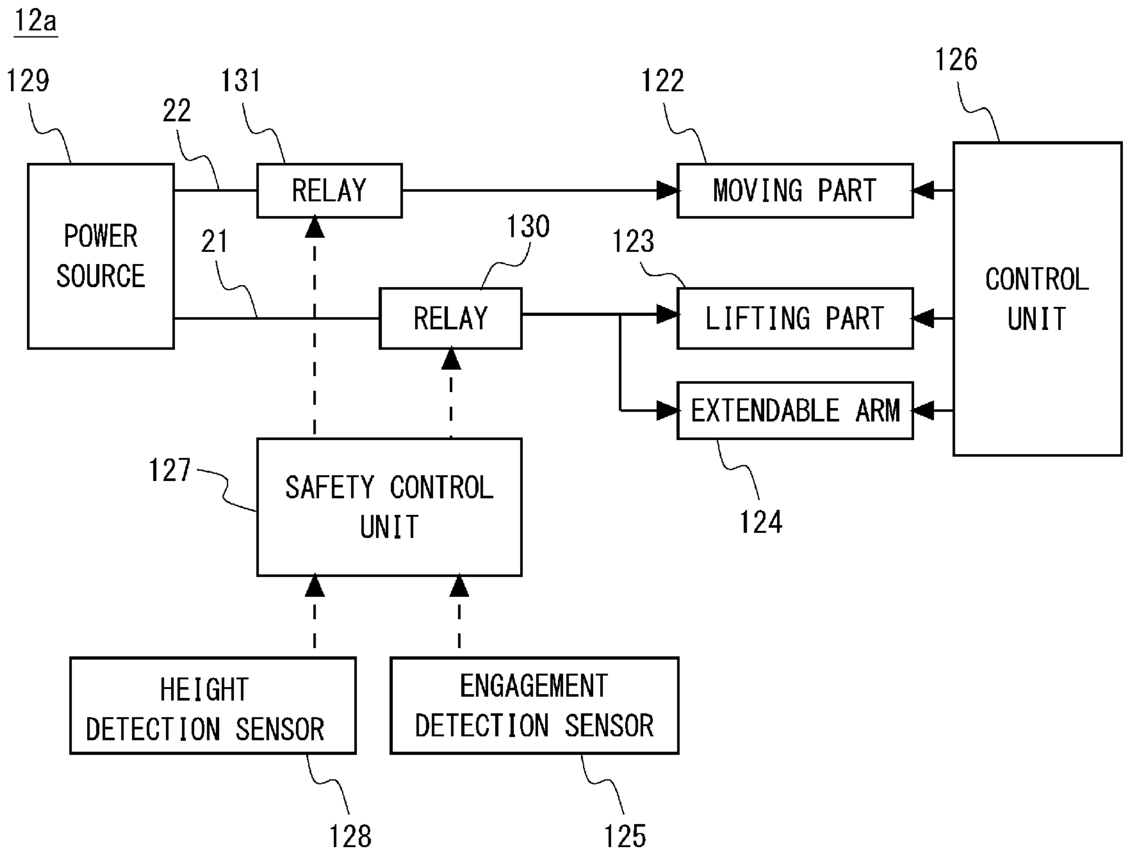
FIG. 7 is a block diagram showing functions of the conveyance robot according to the second embodiment.

FIG. 7 is a block diagram showing a functional configuration of the conveyance robot 12*a*. The conveyance robot 12*a* includes the moving part 122, the lifting part 123, the extendable arm 124, the engagement detection sensor 125, the control unit 126, the safety control unit 127, the height detection sensor 128, a power source 129, a relay 130, and a relay 131.

The control unit 126 provides commands to control the moving part 122, the lifting part 123, and the extendable arm 124. The control unit 126 is also referred to as a robot control apparatus. The control unit 126 is, for example, a Personal Computer (PC).

The safety control unit 127 acquires a result of the detection by the engagement detection sensor 125 and a result of the detection by the height detection sensor 128. The safety control unit 127 performs control to change the state of the relay 130 and the state of the relay 131 based on the acquired results of the detection. The safety control unit 127 is also referred to as a safety control apparatus. The safety control unit 127 is implemented by, for example, a PLC.

When the first condition described above is satisfied, the safety control unit 127 brings the relay 130 into an interrupting state. By doing so, the movement of the lifting part 123 and the movement of the extendable arm 124 are stopped. The first condition includes that the guide rail 113 is not engaged with the mounting table 121 and that the height of the mounting table 121 is greater than or equal to the predetermined height h1. The predetermined height h1 is set greater than the height at which the lower end of the guide rail 113 is located. The predetermined height h1 is set appropriately in accordance with the level of risk of the article falling etc.

When the first condition is satisfied, the mounting table 121 has not been lifted up along the guide rail 113. By the safety control unit 127 stopping the operation of the lifting part 123, it is possible to reduce the level of risk of the article 2 falling and the level of risk of the conveyance robot 12 falling.

Further, when the first condition is satisfied, the extendable arm 124 that has been extended may come into contact with a user. When the mounting table 121 has been lifted up to about the eye level of a user, the level of risk of the extendable arm 124 coming into contact with a user is particularly high. By the safety control unit 127 stopping the operation of the extendable arm 124, it is possible to reduce the level of risk of the extendable arm 124 coming into contact with a user.

When a second condition including that the guide rail 113 is engaged with the mounting table 121 is satisfied, the safety control unit 127 further puts the relay 131 into an interrupting state. By doing so, the operation of the moving part 122 is stopped. The safety control unit 127 may also stop the operation of the moving part 122 when the first condition is satisfied.

When the moving part 122 is operated when the second condition is satisfied, there is a risk of the mounting table 121 and the lifting part 123 being damaged. Further, there is a risk of the article 2 falling from the shelf 11 and the mounting table 121. By stopping the operation of the moving part 122, it is possible to reduce the level of risk of the conveyance robot 12 being damaged and the level of risk of the article 2 falling.

The power source 129 supplies power to the moving part 122, the lifting part 123, and the extendable arm 124. A wiring 21 is a wiring for supplying power to the lifting part 123 and the extendable arm 124. A wiring 22 is a wiring for supplying power to the moving part 122.

The relay 130 (also referred to as a relay 1) is provided on the wiring 21. The relay 130 is also referred to as a first interrupting part. The relay 130 interrupts the supply of the power source 129 to the lifting part 123 and the extendable arm 124. The relay 130 switches the connection state between each of the lifting part 123 and the extendable arm 124 and the power source 129 in response to a control signal sent from the safety control unit 127.

The relay 131 (also referred to as a relay 2) is provided on the wiring 22. The relay 131 is also referred to as a second interrupting part. The relay 131 interrupts the supply of the power source 129 to the moving part 122. The relay 131 switches the connection state between the moving part 122 and the power source 129 in response to a control signal sent from the safety control unit 127.

Note that a driving source such as high-pressure air or oil may be used instead of the power source 129. In this case, the first and the second interrupting parts are composed of valves and the like.

Figure 8:
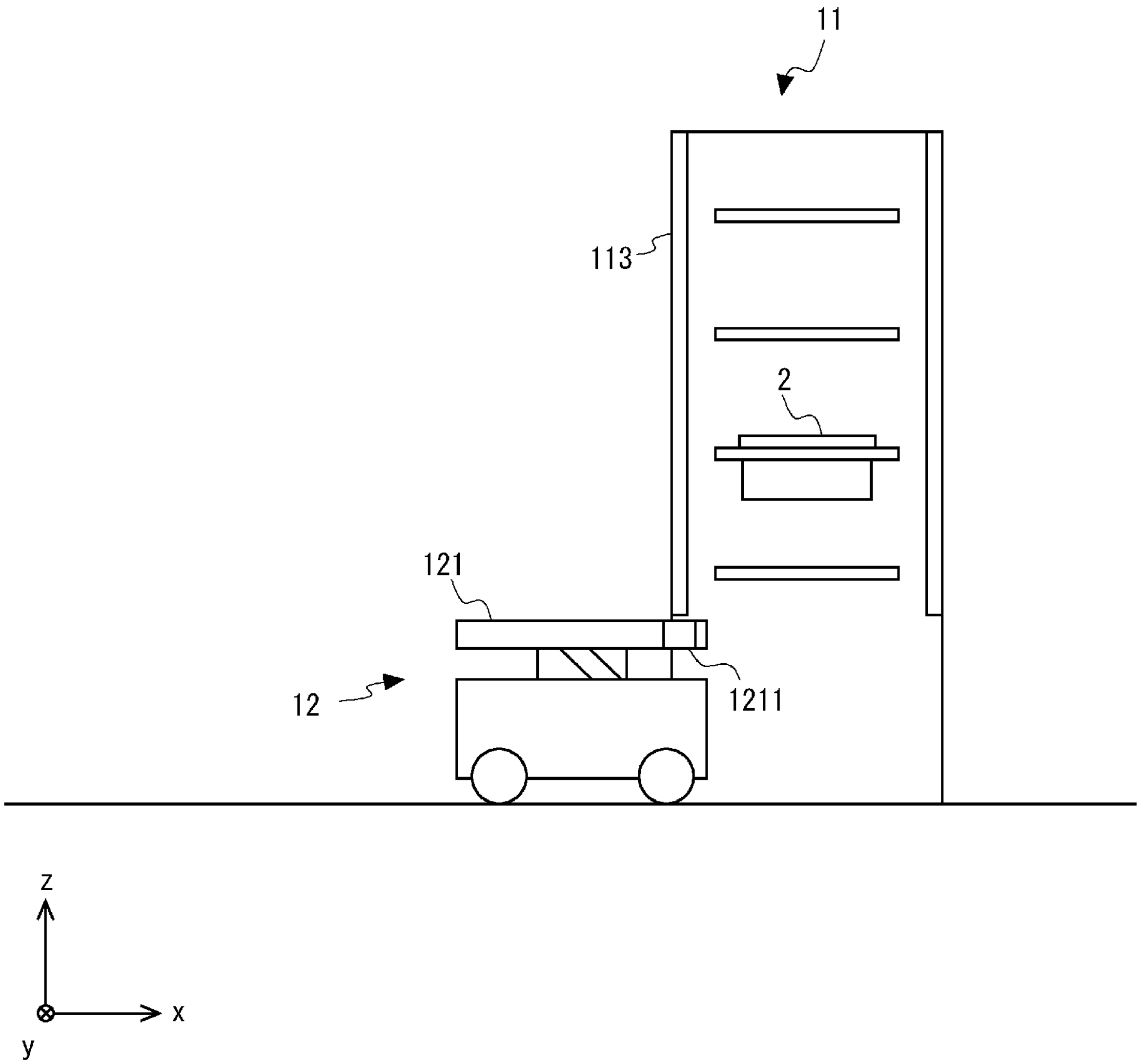
FIG. 8 is a diagram for explaining an operation of the conveyance robot according to the second embodiment.

Next, an outline of operations performed by the conveyance robot 12*a* will be described with reference to FIGS. 8 and 9. FIG. 8 shows a state before the mounting table 121 is engaged with the guide rail 113. The moving part 122 moves so that the position of the groove 1211 in the x direction substantially coincides with the position of the guide rail 113 in the x direction. When the lifting part 123 lifts up the mounting table 121 to the height at which the lower end of the guide rail 113 is located, engagement between the mounting table 121 and the guide rail 113 is started. When the mounting table 121 is engaged with the guide rail 113, the safety control unit 127 stops the operation of the moving part 122.

Figure 9:
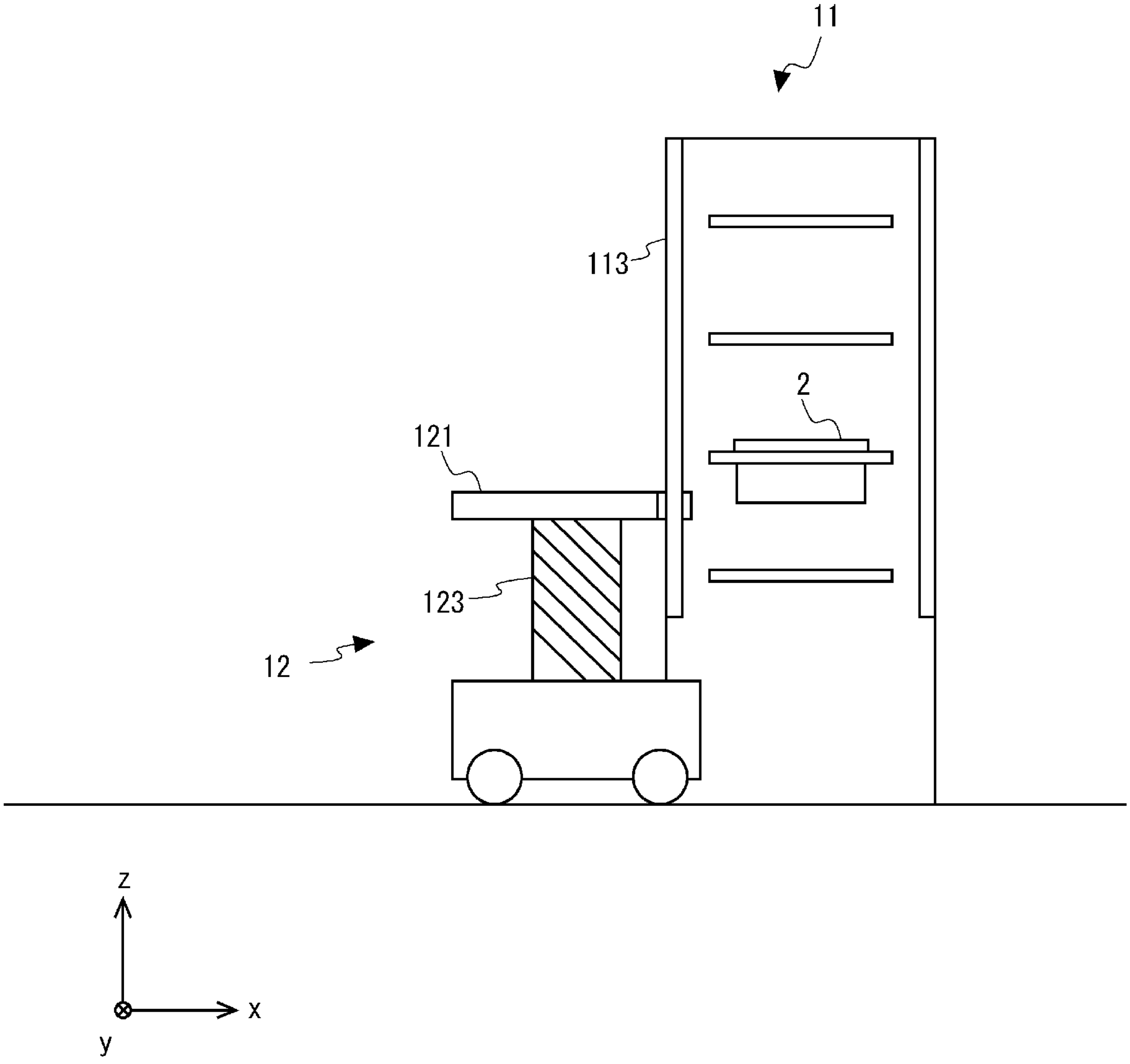
FIG. 9 is a diagram for explaining an operation of the conveyance robot according to the second embodiment.

FIG. 9 shows a state in which the mounting table 121 has been lifted up to the height of the article 2. Since the mounting table 121 is engaged with the guide rail 113, the safety control unit 127 does not stop the operation of the lifting part 123 and the operation of the extendable arm 124. The conveyance robot 12*a* places a load on the mounting table 121 by using the extendable arm 124. On the other hand, when the guide rail 113 is not engaged with the mounting table 121, the safety control unit 127 stops the operation of the lifting part 123.

FIG. 10 is a diagram for explaining an operation of the safety control unit 127. The first column of Table 30 shows the results of the detection by the engagement detection sensor 125. The second column of Table 30 shows the results of the detection by the height detection sensor 128. The third column of Table 30 shows the connection status of the relay 1 (the relay 130). In the table, "ON" indicates a connecting state, while "OFF" indicates an interrupting state. The fourth column of Table 30 shows the connection status of the relay 2 (the relay 131).

First, the state of the relay 1 will be described. As shown in the fourth row of Table 30, when the first condition is satisfied, that is, when the mounting table 121 is not engaged with the guide rail 113 and the height of the mounting table 121 is greater than or equal to the predetermined height h1, the state of the relay 1 is an interrupting state. When the height of the mounting table 121 becomes greater than or equal to the predetermined height h1 without the mounting table 121 being engaged with the guide rail 113 due to an unintended lifting up/down of the mounting table 121 or a failure of engagement between the mounting table 121 and the guide rail 113, the supply of the power source 129 to the lifting part 123 is stopped. Then, the lifting part 123 is brought into a safety torque off state.

Next, the state of the relay 2 will be described. As shown in the second and the third rows of Table 30, when the second condition is satisfied, that is, when the mounting table 121 is engaged with the guide rail 113, the relay 2 is in an interrupting state. Further, as shown in the fourth row of Table 30, the relay 2 is in an interrupting state even when the first condition is satisfied.

Note that in a case in which the operation of the moving part 122 is required when the guide rail 113 is engaged with the mounting table 121, the state of the relay 131 may be set to "ON" in the second row of Table 30. In this case, since the height of the mounting table 121 is low, the level of risk of the lifting part 123 being damaged and the level of risk of an article falling are low. Although it is considered that the appropriate predetermined height h1 is about 1 m, it may be set appropriately in accordance with the respective level of risk factors, such as the weight of an article.

A relay (also referred to as a third interrupting part) that interrupts the supply of the power source 129 to the extendable arm 124 may be provided separately from the relay 131 that interrupts the supply of the power source 129 to the lifting part 123. In this case, when the guide rail 113 is not engaged with the mounting table 121 and the height of the mounting table 121 is greater than or equal to a height h2 different from the predetermined height h1, the relay is brought into an interrupting state. By the above structure, the condition for stopping the extendable arm 124 can be set to a condition different from the condition for stopping the lifting part 123.

The second embodiment can provide advantageous effects similar to those in the case of the first embodiment. Further, the second embodiment can reduce the level of risk due to the movement of the conveyance robot 12 that is engaged with the shelf 11. The second embodiment can reduce the level of risk due to the extension of the extendable arm 124 by the conveyance robot 12 that is not engaged with the shelf 11.

Third Embodiment

Figure 11:
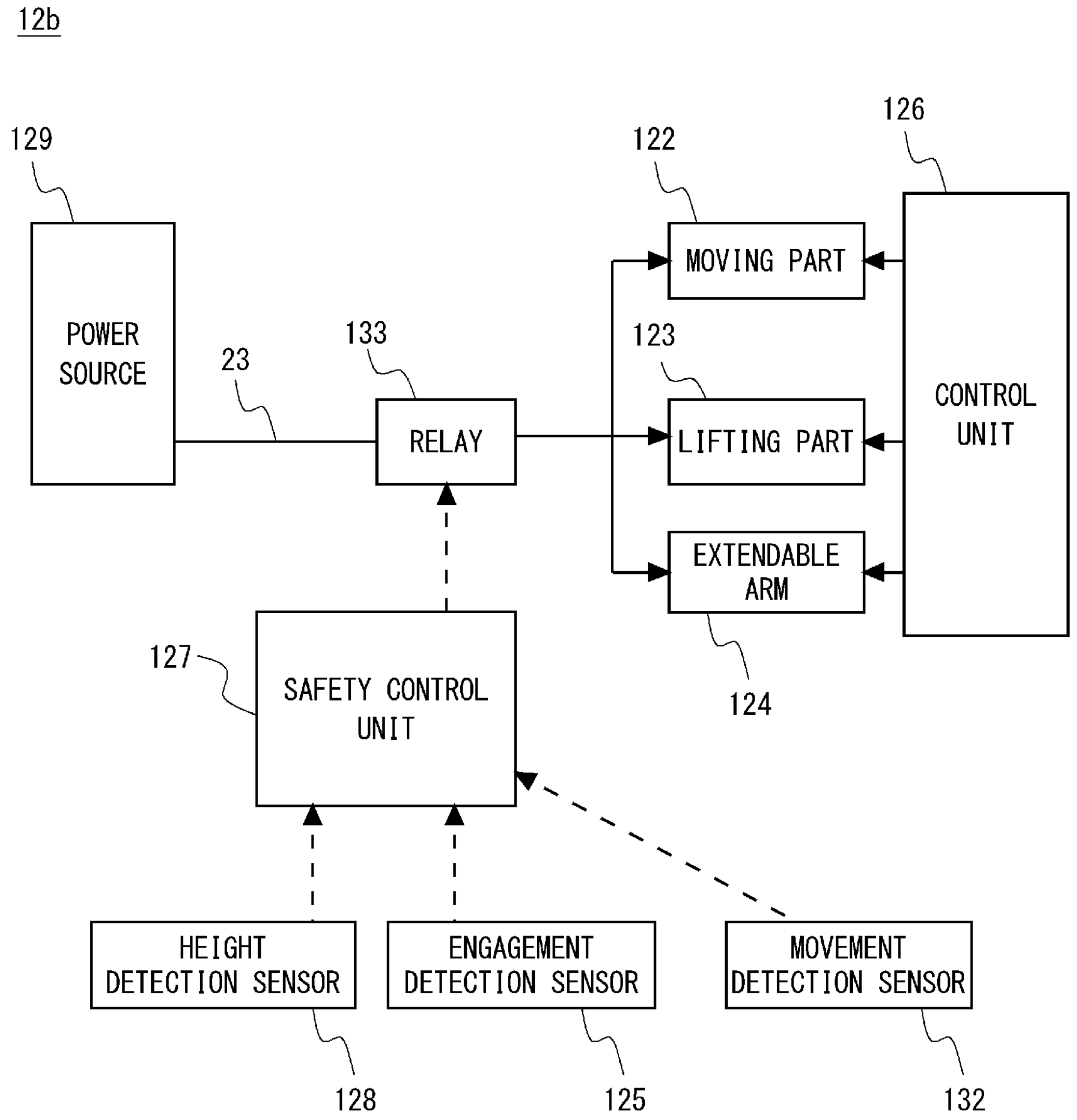
FIG. 11 is a block diagram showing functions of a conveyance robot according to a third embodiment.

A third embodiment is a modified example of the second embodiment. FIG. 11 is a block diagram showing a functional configuration of a conveyance robot 12*b* according to the third embodiment. The conveyance robot 12*b* shown in FIG. 11 further includes a movement detection sensor 132 in addition to the components shown in FIG. 7. The wirings 21 and 22 are replaced by a wiring 23. The relays 130 and 131 are replaced by a relay 133.

The movement detection sensor 132 detects movement performed by the moving part 122. The movement detection sensor 132 may be a speed monitoring sensor that monitors a speed of the moving part 122. The speed may be monitored based on, for example, a rotational speed of the motor 1224. Further, the movement detection sensor 132 may be a sensor that measures a distance between a surrounding environment and the conveyance robot 12. Movement performed by the moving part 122 is detected when there is a change in the measured distance.

The wiring 23 is a wiring for supplying power to the moving part 122, the lifting part 123, and the extendable arm 124.

The relay 133 is provided on the wiring 23. The relay 133 may be referred to simply as a relay. The relay 133 is also referred to as a fourth interrupting part. The relay 133 interrupts the supply of the power source 129 to the moving part 122, the lifting part 123, and the extendable arm 124. The relay 133 switches the connection state between each of the moving part 122, the lifting part 123, and the extendable arm 124 and the power source 129 in response to a control signal sent from the safety control unit 127.

When the first condition is satisfied, the safety control unit 127 brings the relay 133 into an interrupting state. Further, when the second condition is satisfied, the safety control unit 127 brings the relay 133 into an interrupting state. The second condition includes that the guide rail 113 is engaged with the mounting table 121, that the height of the mounting table 121 is greater than or equal to the predetermined height h1, and that the moving part 122 is moving.

FIG. 12 is a diagram for explaining an operation of the safety control unit 127. The third column of Table 40 shows the results of the detection by the movement detection sensor 132. In the table, "x" indicates "don't care". In the table, "=0" indicates that the speed of the moving part 122 is 0, that is, the moving part 122 is not moving. In the table, ">0" indicates that the speed of the moving part 122 is not 0, that is, the moving part 122 is moving. The fourth column of Table 40 shows the connection state of the relay 133 (relay).

As shown in the fourth row of Table 40, when the first condition is satisfied, the relay 133 is "OFF".

As shown in the fifth row of Table 40, when the second condition is satisfied, the relay 133 is "OFF". When the second condition is satisfied, the relay 133 is "OFF" and the speed of the moving part 122 is 0. Therefore, the current state is transitioned from the state shown in the fifth row of Table 40 to the state shown in the third row of Table 40. As a result, the state in which the lifting part 123 or the like can be damaged is transitioned to a safe state.

As shown in the second row of Table 40, the moving part 122 can be moved while the mounting table 121 is engaged with the guide rail 113. However, since the height of the mounting table 121 is less than the predetermined height h1, the level of risk of the lifting part 123 and the like being damaged and the level of risk of an article falling are low. The conveyance robot 12*b* can engage the guide rail 113 with the mounting table 121 while moving.

Note that the conveyance robot 12*b* may not include the extendable arm 124. In this case, the level of risk (e.g., the level of risk of the article 2 falling) other than the risk of the extendable arm 124 coming into contact with a user can be reduced.

The third embodiment can provide advantageous effects similar to those in the case of the second embodiment. The number of interrupting parts used in the third embodiment is less than the number of interrupting parts used in the second embodiment.

The above-described program includes instructions (or software codes) that, when loaded into a computer, cause the computer to perform one or more of the functions. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments and may be changed as appropriate without departing from the scope and spirit of the present disclosure.

For example, the engagement detection sensor 125, the height detection sensor 128, and the movement detection sensor 132 may be provided on the shelf 11 side. In this case, each of these sensors may transmit a result of the detection to the conveyance robot 12 or a server.

Figure 13:
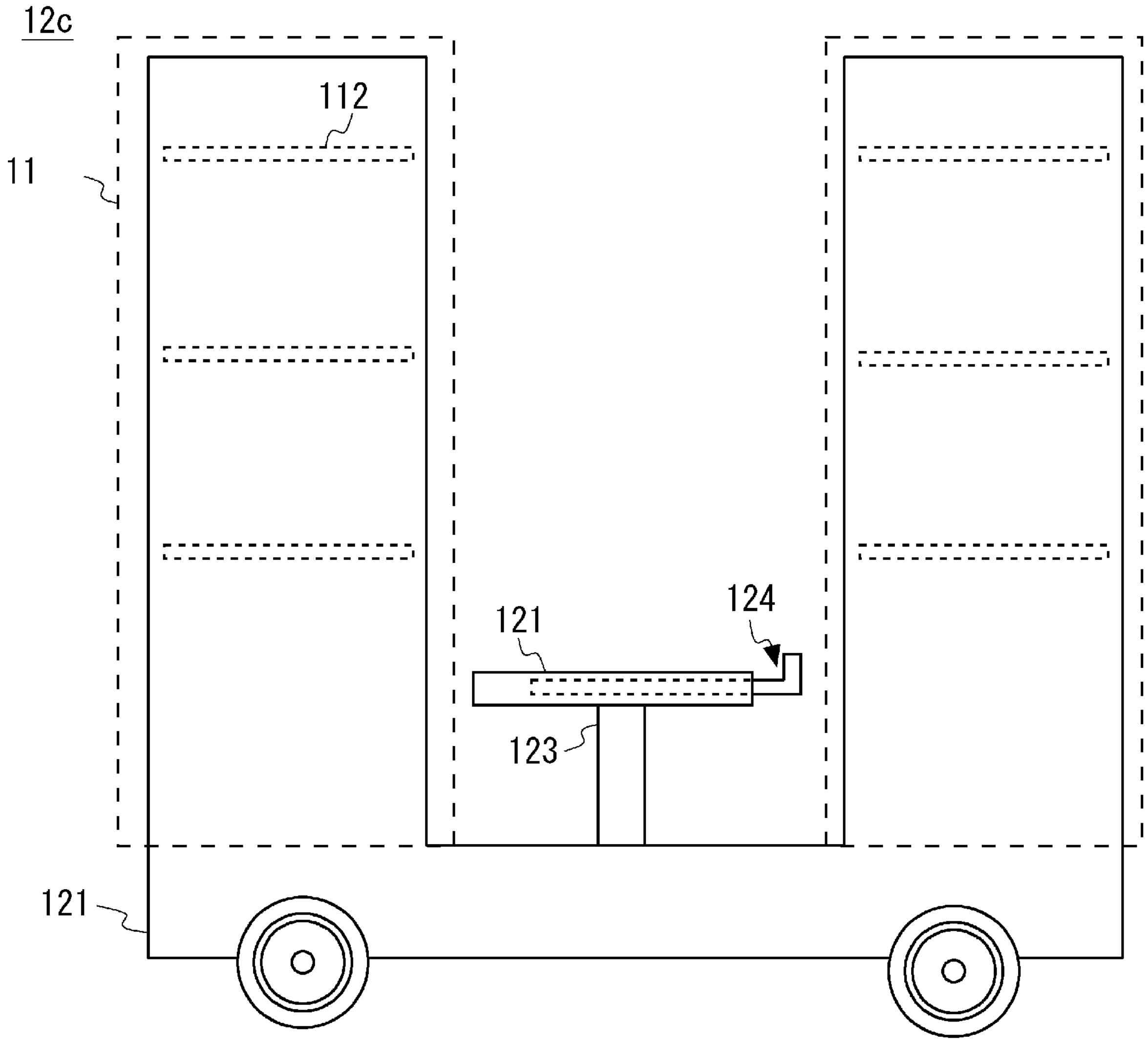
FIG. 13 is a side view of a conveyance robot according to a modified example.

Further, the conveyance system according to the embodiments may include a conveyance robot 12*c* in which the shelf 11 is integrated with the conveyance robot 12. FIG. 13 is a side view showing a configuration of the conveyance robot 12*c*. The mounting table 121 may be rotatable about a vertical axis. In this case, the level of risk of an article falling, the level of risk of the lifting part 123 being damaged, the level of risk of the extendable arm 124 being brought into contact with a user, and the like can be reduced.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:

a shelf provided with a guide rail extending in a vertical direction;

a mounting table that is engageable with the guide rail;

a lifting part configured to lift the mounting table up and down;

an engagement detection sensor configured to detect engagement between the guide rail and the mounting table;

a safety control unit configured to stop an operation of the lifting part when a first condition including that the guide rail is not engaged with the mounting table is satisfied; and a height detection sensor configured to detect a height of the mounting table, wherein the first condition includes that the height of the mounting table is greater than or equal to a predetermined height, the predetermined height being greater than a height at which a lower end of the guide rail is located.

2. The conveyance system according to claim 1, wherein a groove that is engaged with the guide rail is provided in the mounting table, and the engagement detection sensor is provided in the groove.

3. The conveyance system according to claim 1, wherein an extendable arm configured to extend and contract in a horizontal direction is provided in the mounting table, and the safety control unit stops an operation of the extendable arm when the first condition is satisfied.

4. The conveyance system according to claim 1, wherein the lifting part is provided on a movable moving part, and the safety control unit stops an operation of the moving part when a second condition including that the guide rail is engaged with the mounting table is satisfied.

5. The conveyance system according to claim 4, comprising:

a first interrupting part configured to interrupt a supply of a driving source to the lifting part; and a second interrupting part configured to interrupt a supply of a driving source to the moving part, wherein the safety control unit brings the first interrupting part into an interrupting state when the safety control unit stops the operation of the lifting part, and brings the second interrupting part into an interrupting state when the safety control unit stops the operation of the moving part.

6. The conveyance system according to claim 5, wherein an extendable arm configured to extend and contract in a horizontal direction is provided in the mounting table, and the first interrupting part further interrupts a supply of a driving source to the extendable arm.

7. The conveyance system according to claim 5, wherein an extendable arm configured to extend and contract in a horizontal direction is provided in the mounting table, the conveyance system comprises a third interrupting part configured to interrupt a supply of a driving source to the extendable arm, and the safety control unit brings the third interrupting part into an interrupting state when the guide rail is not engaged with the mounting table and the height of the mounting table is greater than or equal to a height that is different from the predetermined height.

8. The conveyance system according to claim 4, wherein the conveyance system comprises:

a movement detection sensor configured to detect movement performed by the moving part; and a fourth interrupting part configured to interrupt a supply of a driving source to each of the moving part and the lifting part, the safety control unit brings the fourth interrupting part into an interrupting state when the first condition is satisfied and when the second condition is satisfied, and the second condition includes that the height of the mounting table is greater than or equal to the predetermined height and that the moving part is moving.

9. The conveyance system according to claim 8, wherein an extendable arm configured to extend and contract in a horizontal direction is provided in the mounting table, and the fourth interrupting part further interrupts a supply of a driving source to the extendable arm.

10. A conveyance method comprising:

detecting engagement between a guide rail and a mounting table, the guide rail extending in a vertical direction and being provided in a shelf, and the mounting table being engageable with the guide rail;

stopping, when a first condition including that the guide rail is not engaged with the mounting table is satisfied, an operation of a lifting part configured to lift the mounting table up and down; and detecting a height of the mounting table using a height detection sensor, wherein the first condition includes that the height of the mounting table is greater than or equal to a predetermined height, the predetermined height being greater than a height at which a lower end of the guide rail is located.

11. A non-transitory computer readable medium storing a program for causing a computer to:

acquire a result of detection by a sensor configured to detect engagement between a guide rail and a mounting table, the guide rail extending in a vertical direction and being provided in a shelf, and the mounting table being engageable with the guide rail;

stop, when a first condition including that the guide rail is not engaged with the mounting table is satisfied, an operation of a lifting part configured to lift the mounting table up and down; and detect a height of the mounting table using a height detection sensor, wherein the first condition includes that the height of the mounting table is greater than or equal to a predetermined height, the predetermined height being greater than a height at which a lower end of the guide rail is located.

* * * * *